United States Patent
Lin et al.

(10) Patent No.: US 9,088,708 B2
(45) Date of Patent: Jul. 21, 2015

(54) IMAGE PROCESSING DEVICE AND METHOD FOR CONTROLLING THE SAME

(71) Applicant: HTC Corporation, Taoyuan (TW)

(72) Inventors: Chun-Ta Lin, Taoyuan County (TW);
Ming-Tien Lin, Taoyuan County (TW);
Chih-Jen Hu, Taoyuan County (TW);
Fu-Cheng Fan, Taoyuan County (TW)

(73) Assignee: HTC CORPORATION, Taoyuan (TW)

( * ) Notice: Subject to any disclaimer, the term of this patent is extended or adjusted under 35 U.S.C. 154(b) by 34 days.

(21) Appl. No.: 13/946,437

(22) Filed: Jul. 19, 2013

(65) Prior Publication Data

US 2015/0022716 A1   Jan. 22, 2015

(51) Int. Cl.
*G03B 13/00* (2006.01)
*H04N 5/232* (2006.01)
*H04N 5/225* (2006.01)

(52) U.S. Cl.
CPC ......... *H04N 5/23212* (2013.01); *H04N 5/2253* (2013.01)

(58) Field of Classification Search
CPC .................................................. H04N 5/23212
USPC ................................................. 348/345–350
See application file for complete search history.

(56) References Cited

U.S. PATENT DOCUMENTS

| 5,493,335 | A | 2/1996 | Parulski et al. |
| 6,704,054 | B1 * | 3/2004 | Hashimoto ................. 348/354 |
| 6,819,360 | B1 * | 11/2004 | Ide et al. .................. 348/340 |
| 2011/0261233 | A1 | 10/2011 | Zhang et al. |
| 2012/0051730 | A1 | 3/2012 | Cote et al. |
| 2013/0010067 | A1 | 1/2013 | Veeraraghavan et al. |

FOREIGN PATENT DOCUMENTS

| JP | 2011-019191 A | 1/2011 |
| TW | I339308 B | 3/2011 |

OTHER PUBLICATIONS

Wonjoo Kim et al., "A 1.5Mpixel RGBZ CMOS Image Sensor for Simultaneous Color and range Image Capture", 2012 IEEE International Solid-State Circuits Conference, pp. 392-394. IEEE, Feb. 2012.
Taiwanese Office Action dated Oct. 21, 2014.

* cited by examiner

*Primary Examiner* — Christopher K Peterson
(74) *Attorney, Agent, or Firm* — Rabin & Berdo, P.C.

(57) ABSTRACT

An image processing apparatus includes a camera module, first and second pixel extraction interfaces, an image processing module, and a focus controller. The camera module includes a lens, a sensor aligned with the lens along a direction, and a focus actuator connected to the lens. The first and the second pixel extraction interfaces are connected to the sensor to acquire a first image at a first frame rate and a second image at a second frame rate, respectively; the second frame rate is greater than the first frame rate. The image processing module determines depth information according to the second image, receives the first image and outputs a corresponding image file. The focus controller is connected between the image processing module and the focus actuator to drive the focus actuator according to the depth information and to adjust a relative distance between the sensor and the lens.

24 Claims, 4 Drawing Sheets

IMAGE PROCESSING DEVICE AND METHOD FOR CONTROLLING THE SAME

BACKGROUND OF THE DISCLOSURE

1. Field of the Disclosure

The disclosure relates to an image processing device and method for controlling the same.

2. Description of the Related Art

When an image processing device (e.g., a camera) captures an image, a process of focusing should be first performed to adjust the focal length of the lens so that the incident light to the lens forms an object on the sensing component of the camera. Whether the incident light is focused on the sensing component precisely determines whether the image formed on the sensing component is clear. Accordingly, the precision of the focusing affects the clearness of the captured image. In addition, it spends some time for accurate focusing in order to capture an image with good clearness.

As the technology progresses, most of the digital cameras available to the market have auto-focus function. The auto-focus function makes use of the digital camera to adjust the focal length of the lens and gradually detects whether the image formed on the sensing component achieves a level of clearness. Since the process of focusing requires a number of repeated adjustments to obtain the appropriate focal length, it is a time consuming process and brings inconvenience to the user. Constrained by the timing difference for focus scanning, it is possible to lose a precious image for a particular moment during taking pictures.

SUMMARY OF THE DISCLOSURE

The disclosure is directed to an image processing device and method for controlling the same. A first image can be acquired at a first frame rate, and a second image can be acquired at a second frame rate greater than the first frame rate. In addition, depth information can be determined according to the second image, and the relative distance between a lens and a sensor can be changed according to the depth information.

According to an embodiment of the disclosure, an image processing apparatus is provided. The image processing apparatus includes a camera module, a first pixel extraction interface, a second pixel extraction interface, an image processing module, and a focus controller. The camera module includes a lens, a sensor, and a focus actuator. The sensor is aligned with the lens along a direction. The focus actuator is connected to the lens, and can drive the lens to move along the direction. The first pixel extraction interface, connected to the sensor, is used for acquiring a first image at a first frame rate. The second pixel extraction interface, connected to the sensor, is used for acquiring a second image at a second frame rate, where the second frame rate is greater than the first frame rate. The image processing module determines depth information according to the second image, and receives the first image and outputs a corresponding image file. The focus controller, connected between the image processing module and the focus actuator, is employed for driving the focus actuator according to the depth information to adjust a relative distance between the sensor and the lens along the direction.

According to another embodiment of the disclosure, a method for controlling an image processing device. The method includes the following steps. An image processing device is provided, including a camera module, a first pixel extraction interface, a second pixel extraction interface, an image processing module, and a focus controller, wherein the camera module includes: a lens, a sensor, and a focus actuator; the sensor is aligned with the lens along a direction; the focus actuator, connected to the lens, is for driving the lens to move along the direction; the first and second pixel extraction interfaces are connected to the sensor; and the focus controller is connected between the image processing module and the focus actuator. A first image is acquired at a first frame rate by the first pixel extraction interface. A second image is acquired at a second frame rate by the second pixel extraction interface, wherein the second frame rate is greater than the first frame rate. Determining depth information according to the second image, receiving the first image, and correspondingly outputting a image file by the image processing module are performed. The focus actuator is driven according to the depth information by the focus controller to adjust a relative distance between the sensor and the lens along the direction.

The above and other aspects of the disclosure will become better understood with regard to the following detailed description of the preferred but non-limiting embodiment(s). The following description is made with reference to the accompanying drawings.

DETAILED DESCRIPTION

Figure 1:
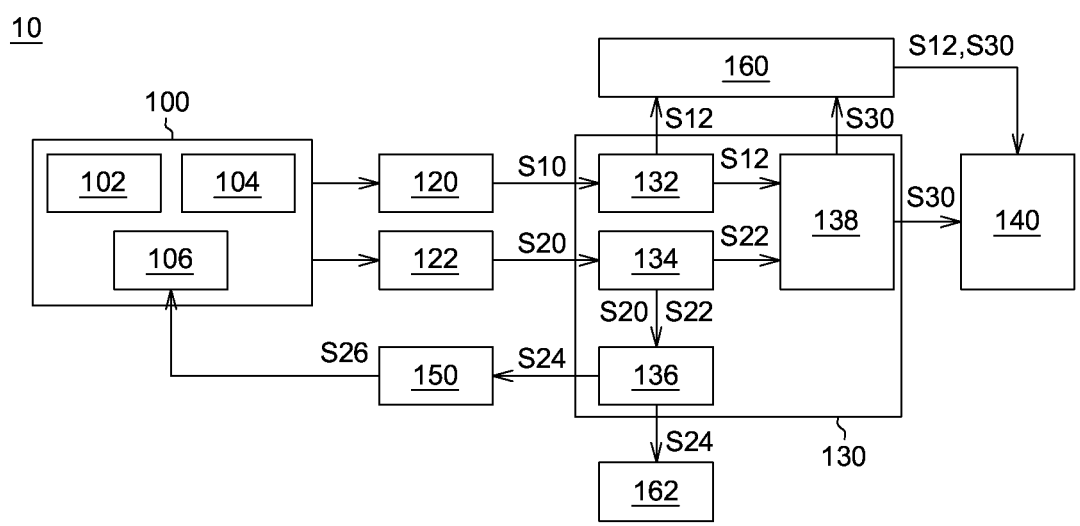
FIG. 1 illustrates a block diagram of an image processing device according to an embodiment of the disclosure.

FIG. 1 illustrates a block diagram of an image processing device 10 according to an embodiment of the disclosure. Referring to FIG. 1, the image processing device 10 includes a camera module 100, a first pixel extraction interface 120, a second pixel extraction interface 122, an image processing module 130, and a focus controller 150. The camera module 100 includes a lens 102, a sensor 104, and a focus actuator 106. The sensor 104, for example, is a fast hybrid sensor, and can be aligned with the lens 102 along a direction. The focus actuator 106 (or auto-focus actuator) is connected to the lens 102, and is capable of driving the lens 102 to move along the direction.

The first pixel extraction interface (or sensor interface) 120, connected to the sensor 104, is employed for acquiring a first image S10 at a first frame rate. The second pixel extraction interface 122, connected to the sensor 104, is used for acquiring a second image S20 at a second frame rate, where the first image S10 is different from the second image S20, and the second frame rate is greater than the first frame rate. The image processing module 130 receives the first image S10 and the second image S20. Specifically, the image processing module 130 can determine depth information S24 according to the second image S20, and can receive the first image S10 and output a corresponding image file S30. The depth information S24 can be sent to the focus controller 150 and/or a memory 162 for storage. The focus controller 150, connected between the image processing module 130 and the focus actuator 106, is employed for driving the focus actuator 106 according to the depth information S24 to adjust a relative distance between the lens 102 and the sensor 104 along the direction.

In one embodiment, the image processing module 130 may include a first image processing unit 132, a second image processing unit 134, and a focusing processing unit 136. The first image processing unit 132 receives the first image S10 and outputs a first image file S12. The second image processing unit 134 receives the second image S20 and outputs a second image file S22. The focusing processing unit 136 receives one of the second image S20 and the second image file S22 to determine the depth information S24. In another embodiment, the image processing module 130 may further include an image integration processing unit 138 for receiving and integrating the first image file S12 and the second image file S22 so as to output the image file S30 to a display 140 or a memory 160. The memory can be employed to store the received first image file S12 and image file S30, and may selectively output the same to the display 140.

In an embodiment, when the first frame rate is less than the second frame rate, the image file S30 corresponds to the first image file S12. In addition, when the first frame rate is equal to the second frame rate, the image file S30 corresponds to the first image file S12 and the second image file S22.

As shown in FIG. 1, the focus controller 150 can receive the depth information S24 outputted by the focusing processing unit 136, and generate a driving signal S26 (such as a driving current, a driving voltage, or a set of driving parameters) to the focus actuator 106 according to the depth information S24 so as to drive the focus actuator 106 to change the relative distance between the lens 102 and the sensor 104 to a focal length.

Figure 2:
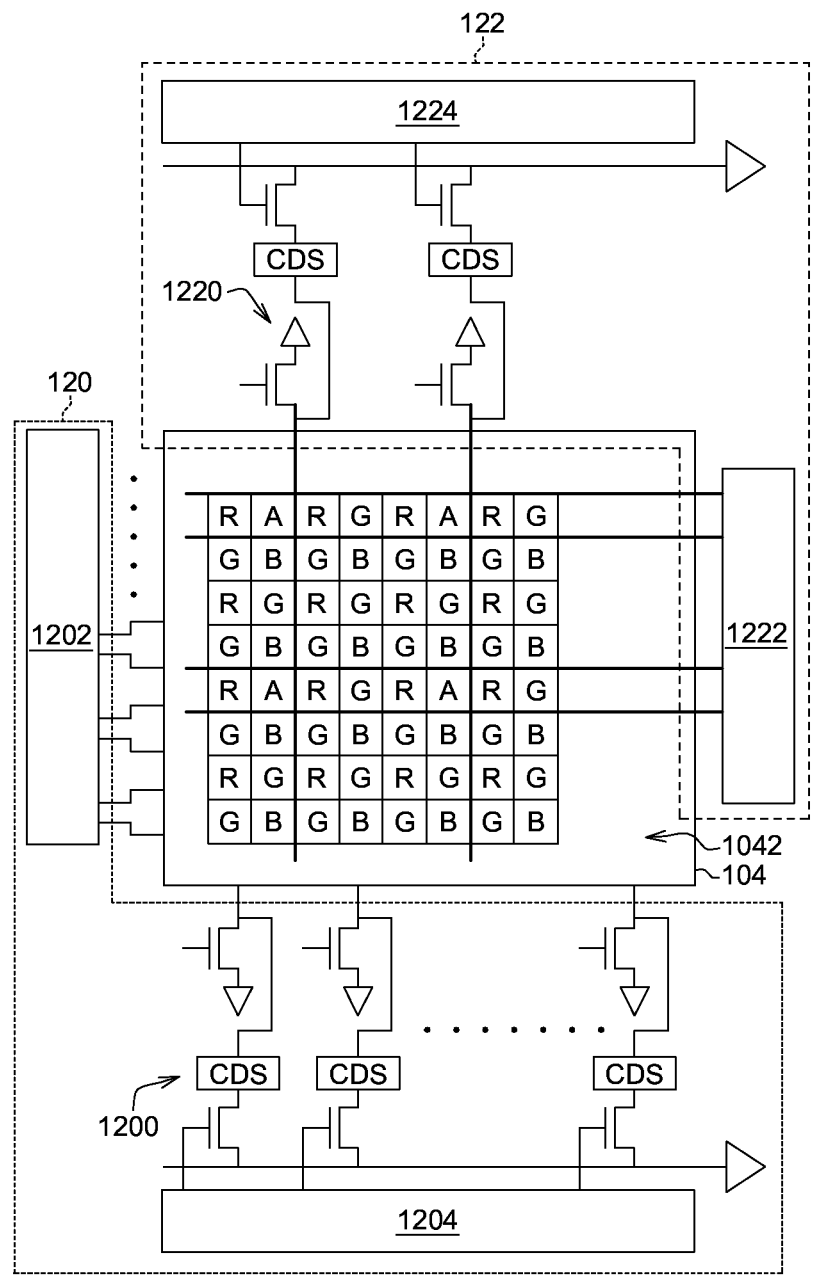
FIG. 2 illustrates a schematic diagram of a pixel extraction interface according to an embodiment of the disclosure.

FIG. 2 illustrates a schematic diagram of a pixel extraction interface according to an embodiment of the disclosure. As shown in FIG. 2, in one embodiment, the sensor includes a main pixel array 1042, wherein the main pixel array 1042 includes a first pixel array and a second pixel array (not shown). The first pixel extraction interface 120 is connected to the first pixel array of the sensor 104. The second pixel extraction interface 122 is connected to the second pixel array of the sensor 104, and the second image S20 is less than the first image S10 in resolution. In one embodiment, a pixel of the main pixel array 1042 may include a red pixel R, green pixel G, blue pixel B, and pixel A, wherein the pixel A may be a color pixel or a monochrome pixel (e.g., pixel R, pixel G, or pixel B) and the arrangement of pixels in the pixel of the main pixel array is not to be limited thereto.

The first image acquiring interface includes: a first sensing circuit 1200, a first timing circuit 1202, and a first timing circuit 1204. The first timing circuit 1204 is employed to control the first sensing circuit 1200 to acquire the sensor 104 and output the first image S10 at the first frame rate. The second image acquiring interface 122 includes a second sensing circuit 1220, a second timing circuit 1222, and a second timing circuit 1224. The second timing circuit 1224 is employed to control the second sensing circuit 1220 to acquire the sensor 104 and output the second image S20 at the second frame rate. For example, the second sensing circuit 1220, controlled by the second timing circuit 1224, can acquire pixels A in the main pixel array 1042 of the sensor 104 and output the pixels A at the second frame rate as the second image S20. In the course of acquiring image, the second frame rate, for example, is greater than the first frame rate so as to speed up the acquiring of the second image S20 or the second image file S22, thus resulting in a faster computation of the depth information S24.

Figure 3:
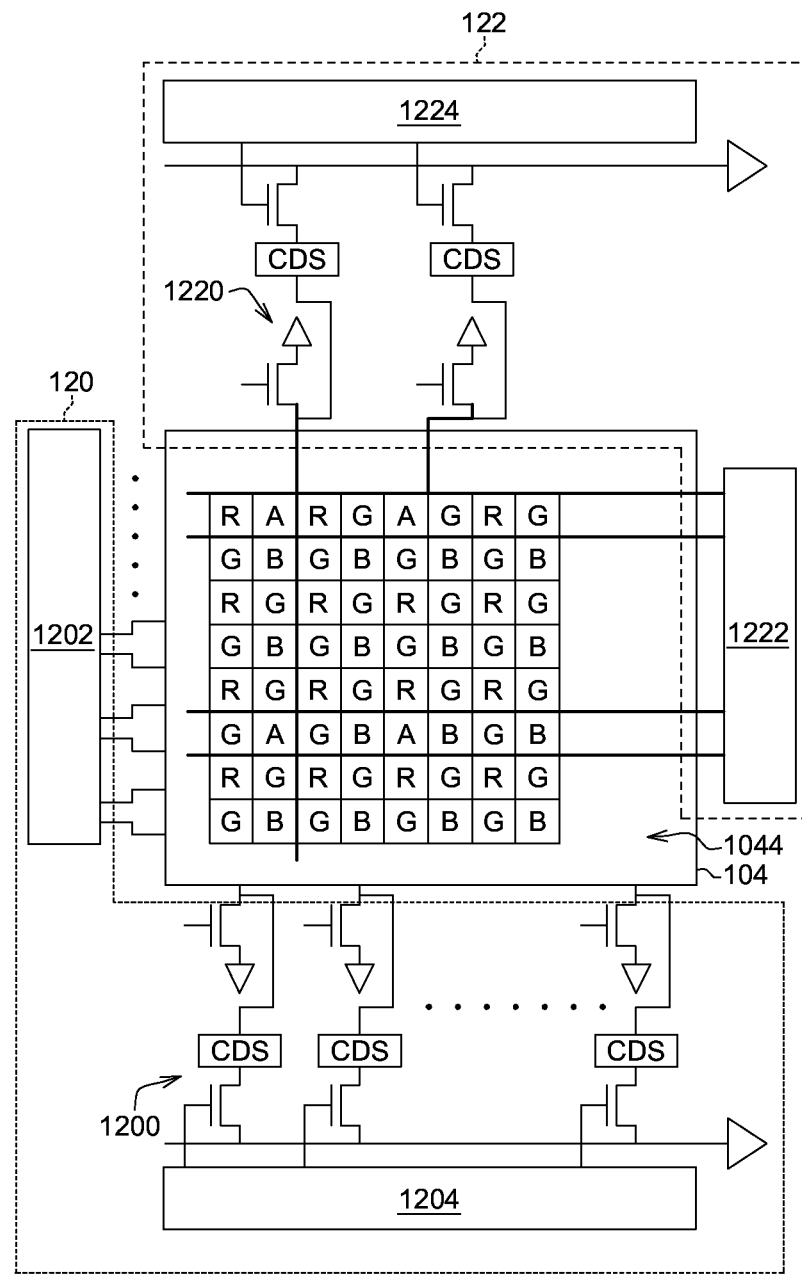
FIG. 3 illustrates a schematic diagram of a pixel extraction interface according to another embodiment of the disclosure.

FIG. 3 illustrates a schematic diagram of a pixel extraction interface according to another embodiment of the disclosure. The pixel extraction interface illustrated in FIG. 3 is similar to that in FIG. 2, but differs in that the pixels in the main pixel array 1042 has a different arrangement. For the sake of explanation, the arrangements of the main pixel array 1042 in FIG. 2 and the main pixel array 1044 in FIG. 3 are illustrated in the disclosure. However, the main pixel arrays 1042 and 1044 may have different arrangements according to different designs, and not limited to the form as illustrated in FIGS. 2 and 3.

In one embodiment, the first image S10 corresponds to the first pixel array, the second image S20 corresponds to the second pixel array, and the first pixel array and the second pixel array are arranged alternately and repeatedly on a same plane.

In one embodiment, the first pixel array is a color pixel array, and upon receiving infrared light, the second pixel array correspondingly generates the second image S20.

In one embodiment, the main pixel array 1042 or 1044 can be divided into a plurality of regions. The second pixel array may be a color pixel array resulting from an arrangement of selected pixels from each of the regions of the main pixel array 1042 (or the main pixel array 1044). The first pixel array is another color pixel array resulting from an arrangement of remaining pixels of the main pixel array 1042 (or the main pixel array 1044) removing the selected pixels for the second pixel array. That is, the first pixel array and the second pixel array both are color pixel arrays.

Figure 4:
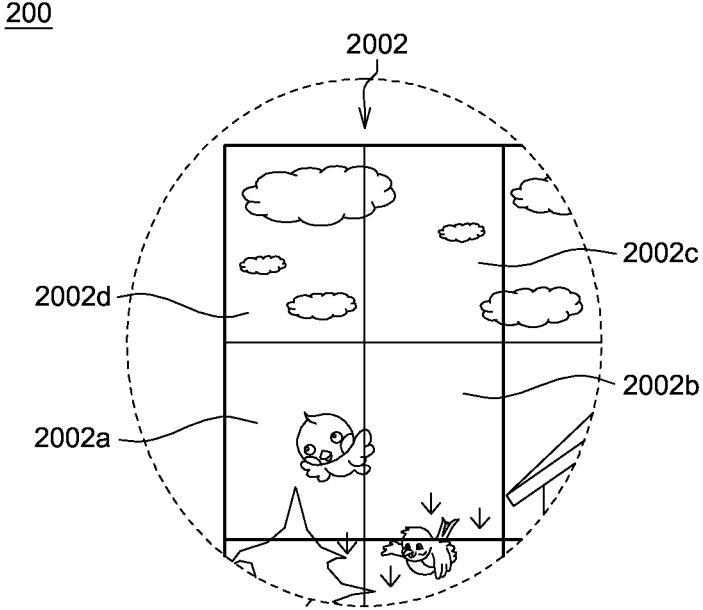
FIG. 4 illustrates a schematic diagram for a method of generating depth information according to an embodiment of the disclosure.
Figure 4:
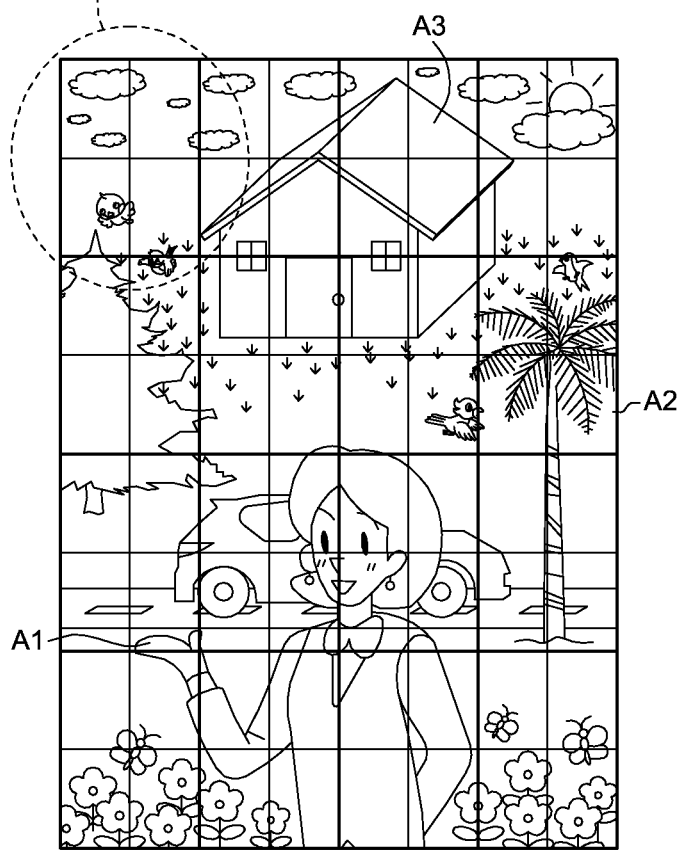

Referring to FIG. 4, a schematic diagram illustrates a method of generating depth information according to an embodiment of the disclosure. As illustrated in FIG. 4, an image 200 may include a plurality of regions 2002, each region 2002 has a plurality of unit regions, for example, unit regions 2002a, 2002b, 2002c, and 2002d. In the embodiment as illustrated in FIG. 4, the image 200 includes 16 regions 2002 (e.g., each of the horizontal and vertical axes divided by 4 equal parts) and each of the regions 2002 has 4 unit regions, resulting in that the whole image 200 has 64 unit regions. The division of regions and the number of unit regions can be changed according to the design requirement for the product, without limited to the above.

Referring to FIGS. 2-4, in one embodiment, when the image processing device 10 captures the image 200, the regions 2002 of the image 200 correspond to the respective regions of the main pixel array 1042 (or the main pixel array 1044). In each of the regions 2002 of the image 200, a unit region (e.g., unit region 2002a) is selected individually for an arrangement resulting in the second image S20 (corresponding to the second pixel array). In addition, an arrangement of the remaining pixels of the image 200 removing the selected unit regions for the second image S20 results in the first image S10. The image 200 may include the first image S10 (corresponding to the first pixel array) and the second image S20.

For example, a unit region can be selected from each of the 16 regions of the image 200 for an arrangement resulting in the second image S20, and an arrangement of the remaining regions of the image 200 removing the selected 16 unit regions for the second image results in the first image S10. In this case, the second image S10, for example, is resulted from an arrangement of the 16 unit regions while the first image S10 is resulted from an arrangement of the 48 unit regions.

In one embodiment, an optimal focus position for each unit region can be determined by evaluating the results of scanning a scene from near to far according to the distance between the scene and the lens. As shown in FIG. 4, a unit region A1 has a nearer image depth, a unit region A3 has a farther image depth, and a unit region A2 has an image depth between the image depths of the unit regions A1 and A3.

The second image S20 includes the unit regions selected from each of the regions 2002 of the image 200, where each unit region has its corresponding optimal focus position. The focusing processing unit 136 (as illustrated in FIG. 1) can output information of the unit regions and the corresponding optimal focus positions as the depth information S24 according to the second image S20 or the second image file S22 provided by the second image processing unit 134. Since the selected unit regions included in the second image S20 are smaller than the unit regions included in the first image S10 (i.e., the second image S20 has a smaller resolution than that of the first image S10), the depth information can be determined faster by using the second image S20 (or the second image file S22).

As provided in the embodiments of the disclosure of the image processing device and the control method thereof, the image processing device includes a first pixel extraction interface and a second pixel extraction interface, which can acquire images at different frame rates. Determining the depth information using the images acquired by the pixel extraction interface at a higher frame rate and accordingly driving the actuator to change the relative distance between the lens and the sensor can achieve fast focusing and focusing accuracy, thus fulfilling requirements of the users and the market.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

Description of the Numerals
10: image processing device
100: camera module
102: lens
104: sensor
1042, 1044: main pixel arrays
106: focus actuator 106
120, 122: pixel extraction interfaces
1202, 1220, 1222, 1224: timing circuits
1200, 1220: sensing circuits
130: image processing module
132, 134: image processing units
136: focusing processing unit
138: image integration processing unit
140: display
150: focus controller
160, 162: memory
200: image
2002: regions
2002a, 2002b, 2002c, 2002d, A1, A2, A3: unit regions
S10, S20: images
S12, S22, S30: image files
S24: depth information
S26: driving signal

What is claimed is:
1. An image processing apparatus, comprising:
a camera module for capturing an image that is dividable into a plurality of unit regions, comprising:
a lens;
a sensor, aligned with the lens along a direction; and
a focus actuator, connected to the lens, for driving the lens to move along the direction;
a first pixel extraction interface, connected to the sensor, for acquiring a plurality of first regions of the image, one at a time, at a first rate, each first region corresponding to one of the plurality of unit regions, and having a size larger than that of the corresponding unit region;
a second pixel extraction interface, connected to the sensor, for acquiring the plurality of unit regions, one at a time, at a second rate, is the second rate being greater than the first rate;
an image processing module, for determining depth information according to the plurality of unit regions, receiving the plurality of first regions and outputting a corresponding image file; and
a focus controller, connected between the image processing module and the focus actuator, for driving the focus actuator according to the depth information to adjust a relative distance between the sensor and the lens along the direction.

2. The image processing apparatus according to claim 1, wherein:
the sensor comprises a first pixel array and a second pixel array; and
the first pixel extraction interface is connected to the first pixel array of the sensor; and the second pixel extraction interface is connected to the second pixel array of the sensor, and the plurality of unit regions are less than the plurality of first regions in resolution.

3. The image processing apparatus according to claim 2, wherein the plurality of first regions correspond to the first pixel array, the plurality of unit regions correspond to the second pixel array, the sensor comprises a main pixel array, the main pixel array includes the first pixel array and the second pixel array, and the first pixel array and the second pixel array are arranged alternately and repeatedly on a same plane.

4. The image processing apparatus according to claim 3, wherein the first pixel array is a color pixel array, and the second pixel array, when receiving infrared light, generates the plurality of unit regions correspondingly.

5. The image processing apparatus according to claim 2, wherein the plurality of first regions correspond to the first pixel array, the plurality of unit regions correspond to the second pixel array, the sensor comprises a main pixel array, the main pixel array is divided into a plurality of regions, the second pixel array is a color pixel array resulting from an arrangement of selected pixels from each of the regions of the main pixel array, and the first pixel array is another color pixel array resulting from an arrangement of remaining pixels of the main pixel array removing the selected pixels for the second pixel array.

6. The image processing apparatus according to claim 1, wherein the image processing module comprises:
a first image processing unit for receiving the plurality of first regions and outputting a first image file;
a second image processing unit for receiving the plurality of unit regions and outputting a second image file; and
a focusing processing unit for receiving the second image file or the plurality of unit regions to determine the depth information.

7. The image processing apparatus according to claim 6, wherein the image processing module further comprises:
an image integration processing unit, for receiving and integrating the first image file and the second image file to output the image file to a display or a memory.

8. The image processing apparatus according to claim 6, wherein the focus controller is for receiving the depth information outputted by the focusing processing unit, and for generating a driving current or a driving voltage to the focus actuator according to the depth information to drive the focus actuator to change the relative distance to a focal length.

9. The image processing apparatus according to claim 6, wherein when the first rate is less than the second rate, the image file corresponds to the first image file; and when the first rate is equal to the second rate, the image file corresponds to the first image file and the second image file.

10. The image processing apparatus according to claim 1, wherein the focus controller is for generating a set of driving parameters according to the depth information, and the focus actuator is for changing the relative distance to a focal length according to the set of driving parameters.

11. The image processing apparatus according to claim 1, wherein the first image acquiring interface comprises:
    a first sensing circuit for acquiring the sensor and outputting the plurality of first regions; and
    a first timing circuit for controlling the first sensing circuit to output the plurality of first regions at the first rate.

12. The image processing apparatus according to claim 11, wherein the second image acquiring interface comprises:
    a second sensing circuit for acquiring the sensor and outputting the plurality of unit regions; and
    a second timing circuit for controlling the second sensing circuit to output the plurality of unit regions at the second rate.

13. The image processing apparatus according to claim 1, wherein each of unit regions corresponds to an optimal focus position, and the depth information includes the optimal focus positions of the unit regions.

14. A method for controlling an image processing device, comprising:
    providing an image processing device including a camera module, a first pixel extraction interface, a second pixel extraction interface, an image processing module, and a focus controller, wherein the camera module includes: a lens, a sensor, and a focus actuator; the sensor is aligned with the lens along a direction; the focus actuator, connected to the lens, is for driving the lens to move along the direction; the first and second pixel extraction interfaces are connected to the sensor; and the focus controller is connected between the image processing module and the focus actuator;
    capturing an image by the camera module, wherein the image is dividable into a plurality of unit regions;
    acquiring a plurality of first regions of the image, one at a time, at a first rate by the first pixel extraction interface, wherein each first region corresponds to one of the plurality of unit regions, and has a size larger than that of the corresponding unit region;
    acquiring the plurality of unit regions, one at a time, at a second rate by the second pixel extraction interface, wherein the second rate is greater than the first rate;
    determining depth information according to the plurality of unit regions, receiving the plurality of first regions, and correspondingly outputting an image file by the image processing module; and
    driving the focus actuator according to the depth information by the focus controller to adjust a relative distance between the sensor and the lens along the direction.

15. The method for controlling the image processing device according to claim 14, wherein the image processing module includes: a first image processing unit, a second image processing unit, and a focusing processing unit, wherein the step of determining the depth information according to the plurality of unit regions, receiving the plurality of first regions comprises:
    receiving the plurality of first regions and outputting a first image file by the first image processing unit;
    receiving the plurality of unit regions and outputting a second image file by the second image processing unit; and
    receiving the second image file or the plurality of unit regions to determine the depth information by the focusing processing unit.

16. The method for controlling the image processing device according to claim 15, wherein the step to adjust the relative distance between the sensor and the lens along the direction comprises:
    receiving, by the focus controller, the depth information outputted by the focusing processing unit; and
    generating and applying to the focus actuator, by the focus controller, a driving current or a driving voltage according to the depth information, to drive the focus actuator to change the relative distance to a focal length.

17. The method for controlling the image processing device according to claim 14, wherein the image processing module further includes an image integration processing unit, and the step of outputting the image file comprises:
    receiving and integrating the first image file and the second image file, by the image integration processing unit, to output the image file to a display or a memory.

18. The method for controlling the image processing device according to claim 14, wherein the step to adjust the relative distance between the sensor and the lens along the direction comprises:
    generating, by the focus controller, a driving parameter according to the depth information; and
    changing, by the focus actuator, the relative distance to a focal length according to the driving parameter.

19. The method for controlling the image processing device according to claim 14, wherein the first image acquiring interface includes a first sensing circuit and a first timing circuit, and the step of acquiring the plurality of first regions at the first rate comprises:
    acquiring the sensor and outputting the plurality of first regions by the first sensing circuit; and
    controlling, by the first timing circuit, the first sensing circuit to output the plurality of first regions at the first rate.

20. The method for controlling the image processing device according to claim 19, wherein the second image acquiring interface includes a second sensing circuit and a second timing circuit, and the step of acquiring the plurality of unit regions at the second rate comprises:
    acquiring the sensor and outputting the plurality of unit regions by the second sensing circuit; and
    controlling, by the second timing circuit, the second sensing circuit to output the plurality of unit regions at the second rate.

21. The method for controlling the image processing device according to claim 14, wherein the plurality of first regions correspond to a first pixel array, the plurality of unit regions correspond to a second pixel array, the sensor includes a main pixel array, the main pixel array includes the first pixel array and the second pixel array, and the first pixel array and the second pixel array are arranged alternately and repeatedly on a same plane.

22. The method for controlling the image processing device according to claim 14, wherein the sensor includes a main pixel array, the main pixel array is divided into a plurality of regions, and the method further comprises:
    providing a first pixel array and a second pixel array, wherein the first pixel array corresponds to the plurality of first regions, the second pixel array corresponds to the plurality of unit regions, the second pixel array is a color pixel array resulting from an arrangement of selected pixels from each of the regions of the main pixel array, and the first pixel array is another color pixel array resulting from an arrangement of remaining pixels of the main pixel array removing the selected pixels for the second pixel array.

23. The method for controlling the image processing device according to claim 14, wherein each of unit regions corresponds to an optimal focus position, and the depth information includes the optimal focus positions of the unit regions.

24. The method for controlling the image processing device according to claim 14, wherein when the first rate is less than the second rate, the image file corresponds to the first image file; and when the first rate is equal to the second rate, the image file corresponds to the first image file and the second image file.

* * * * *